(12) United States Patent
Fini et al.

(10) Patent No.: US 11,137,548 B2
(45) Date of Patent: Oct. 5, 2021

(54) RETRO REFLECTOR AND ASSOCIATED METHODS

(71) Applicant: Ayar Labs, Inc., Emeryville, CA (US)

(72) Inventors: John Fini, Oakland, CA (US); Roy Edward Meade, Lafayette, CA (US); Derek Van Orden, San Francisco, CA (US); Forrest Sedgwick, Emeryville, CA (US)

(73) Assignee: Ayar Labs, Inc., Santa Clara, CA (US)

( * ) Notice: Subject to any disclaimer, the term of this patent is extended or adjusted under 35 U.S.C. 154(b) by 0 days.

(21) Appl. No.: 16/683,123

(22) Filed: Nov. 13, 2019

(65) Prior Publication Data

US 2020/0158961 A1    May 21, 2020

Related U.S. Application Data

(60) Provisional application No. 62/769,516, filed on Nov. 19, 2018.

(51) Int. Cl.
*G02B 6/34* (2006.01)
*G02B 6/122* (2006.01)
(Continued)

(52) U.S. Cl.
CPC ............. *G02B 6/34* (2013.01); *G02B 6/1225* (2013.01); *G02B 6/29328* (2013.01); *G02B 6/4214* (2013.01); *G02B 2006/12104* (2013.01)

(58) Field of Classification Search
CPC ...... G02B 6/34; G02B 6/1225; G02B 6/4214; G02B 6/29328; G02B 2006/12104;
(Continued)

(56) References Cited

U.S. PATENT DOCUMENTS 8,270,791 B2 * 9/2012 Komura ................. G11B 5/314
                                                       385/37
9,240,673 B2 * 1/2016 Rickman ............... H01S 5/3031
(Continued)

OTHER PUBLICATIONS

Arbabi, Amir et al., "Planar Retroreflector," Optical Society of America, 2014 Conference on Lasers and Electro-Optics (CLEO), Jun. 8, 2014.
(Continued)

*Primary Examiner* — Ellen E Kim
(74) *Attorney, Agent, or Firm* — Penilla IP, APC (57) ABSTRACT

A grating coupler reflector (retro reflector) is formed within a photonics chip and includes a vertical scattering region, an optical waveguide, and a reflector. The optical waveguide is optically coupled to the vertical scattering region. The reflector is positioned at an end of the optical waveguide. The reflector is configured to reflect light that propagates through the optical waveguide from the vertical scattering region back toward the vertical scattering region. The location of the grating coupler reflector on the photonics chip is determinable by scanning a light emitting active optical fiber over the chip and detecting when light is reflected back into the active optical fiber from the grating coupler reflector. The determined location of the grating coupler reflector on the photonics chip is usable as a reference location for aligning optical fiber(s) to corresponding optical grating couplers on the photonics chip.

35 Claims, 9 Drawing Sheets

(51) Int. Cl.
*G02B 6/42* (2006.01)
*G02B 6/293* (2006.01)
*G02B 6/12* (2006.01)

(58) Field of Classification Search
CPC .. G02B 6/4222; G02B 6/4224; G02B 6/4225; G02B 6/422; G02B 6/30
See application file for complete search history.

(56) References Cited

U.S. PATENT DOCUMENTS

| | | | | |
|---|---|---|---|---|
| 9,495,984 | B2* | 11/2016 | Yuan | G11B 7/124 |
| 10,088,299 | B2* | 10/2018 | Tokushima | G02B 6/422 |
| 2010/0092128 | A1* | 4/2010 | Okayama | G02B 6/4246 |
| | | | | 385/14 |
| 2011/0133063 | A1* | 6/2011 | Ji | G02B 6/124 |
| | | | | 250/227.24 |
| 2015/0280402 | A1* | 10/2015 | Gubenko | H01S 5/12 |
| | | | | 372/50.11 |
| 2018/0143485 | A1* | 5/2018 | Oh | G02B 5/1847 |
| 2018/0164591 | A1* | 6/2018 | Saarikko | G02B 27/0172 |
| 2018/0191137 | A1* | 7/2018 | Bovington | H01S 5/50 |

OTHER PUBLICATIONS

Arbabi, Amir et al., "Planar Metasurface Retroreflector," Nature Photonics, vol. 11, Jul. 2017, pp. 415-421.

Polster, Robert et al., "Challenges and Solutions for High-Volume Testing of Silicon Photonics," Silicon Photonics XIII, vol. 10537, International Society for Optics and Photonics, Feb. 22, 2018.

Taillaert, Dirk et al., "Grating Couplers for Coupling between Optical Fibers and Nanophotonic Waveguides," Japanese Journal of Applied Physics, vol. 45, No. 8A, pp. 6071-6077, Aug. 4, 2006.

Wade, Mark T. et al., "75% Efficient Wide Bandwidth Grating Couplers in a 45 nm Microelectronics CMOS Process," Optical Interconnects Conference (OI), IEEE, Apr. 20, 2015.

\* cited by examiner

Fig. 2B (View A-A)

```
                                                            ┌─ 801
┌──────────────────────────────────────────────────────────────┐
│ Having a photonics chip that includes a grating coupler reflector and an optical │
│ grating coupler, where the grating coupler reflector includes a vertical scattering │
│ region, an optical waveguide optically coupled to the vertical scattering region, and │
│ a reflector positioned at an end of the optical waveguide, and where the reflector is │
│ configured to reflect light that propagates through the optical waveguide from the │
│ vertical scattering region back toward the vertical scattering region such that the │
│ reflected light is re-directed out of the photonics chip by the vertical scattering │
│ region as emitted light, and where the optical grating coupler has a location on the │
│ photonics chip that is known relative to a location of the grating coupler reflector on │
│                          the photonics chip.                 │
└──────────────────────────────────────────────────────────────┘
                              ▼                             ┌─ 803
┌──────────────────────────────────────────────────────────────┐
│ Scanning an end of an active optical fiber over the photonics chip as light is │
│ emitted from the end of the active optical fiber, where the active optical fiber is │
│ connected to a photodetector device to detect when light enters into the end of the │
│                       active optical fiber.                  │
└──────────────────────────────────────────────────────────────┘
                              ▼                             ┌─ 805
┌──────────────────────────────────────────────────────────────┐
│ Detecting light entering the end of the active optical fiber when scanning the end of │
│  the active optical fiber over the photonics chip, where the detected light │
│       corresponds to emitted light from the grating coupler reflector. │
└──────────────────────────────────────────────────────────────┘
                              ▼                             ┌─ 807
┌──────────────────────────────────────────────────────────────┐
│ Stopping the scanning of the end of the active optical fiber over the photonics chip │
│ upon detecting light entering the end of the active optical fiber, where a location of │
│  the end of the active optical fiber on the photonics chip indicates a determined │
│           location of the grating coupler reflector on the photonics chip. │
└──────────────────────────────────────────────────────────────┘
                              ▼                             ┌─ 809
┌──────────────────────────────────────────────────────────────┐
│ Using the determined location of the grating coupler reflector on the photonics chip │
│       to determine a location of the optical grating coupler on the photonics chip. │
└──────────────────────────────────────────────────────────────┘
                              ▼                             ┌─ 811
┌──────────────────────────────────────────────────────────────┐
│ Aligning an optical fiber to the determined location of the optical grating coupler on │
│                          the photonics chip.                 │
└──────────────────────────────────────────────────────────────┘
```

RETRO REFLECTOR AND ASSOCIATED METHODS

CLAIM OF PRIORITY

This application claims priority under 35 U.S.C. 119(e) to U.S. Provisional Patent Application No. 62/769,516, filed Nov. 19, 2018, the disclosure of which is incorporated herein by reference in its entirety for all purposes.

BACKGROUND

Optical data communication systems operate by modulating laser light to encode digital data patterns. The modulated laser light is transmitted through an optical data network from a sending node to a receiving node. The modulated laser light having arrived at the receiving node is de-modulated to obtain the original digital data patterns. Therefore, implementation and operation of optical data communication systems is dependent upon having reliable and efficient mechanisms for transmitting laser light and detecting laser light at different nodes within the optical data network. In this regard, it can be necessary to transmit laser light from an optical fiber to a chip, and vice-versa, which requires proper positioning and securing of the optical fiber relative to the chip. It is within this context that the present invention arises.

SUMMARY

In an example embodiment, a grating coupler reflector is disclosed. The grating coupler reflector includes a vertical scattering region formed within a photonics chip. The grating coupler reflector also includes an optical waveguide formed within the photonics chip. The optical waveguide is optically coupled to the vertical scattering region. The grating coupler reflector also includes a reflector formed within the photonics chip. The reflector is positioned at an end of the optical waveguide. The reflector is configured to reflect light that propagates through the optical waveguide from the vertical scattering region back toward the vertical scattering region.

In an example embodiment, a method is disclosed for manufacturing a grating coupler reflector. The method includes forming a vertical scattering region within a photonics chip. The method also includes forming an optical waveguide within the photonics chip so that the optical waveguide is optically coupled to the vertical scattering region. The method also includes forming a reflector within the photonics chip at an end of the optical waveguide. The reflector is formed to reflect light that propagates through the optical waveguide from the vertical scattering region back toward the vertical scattering region.

In an example embodiment, a photonics chip is disclosed. The photonics chip includes a grating coupler reflector. The grating coupler reflector includes a vertical scattering region, an optical waveguide optically coupled to the vertical scattering region, and a reflector positioned at an end of the optical waveguide. The reflector of the grating coupler reflector is configured to reflect light that propagates through the optical waveguide from the vertical scattering region back toward the vertical scattering region. The photonics chip also includes at least one optical grating coupler having a location on the photonics chip that is known relative to a location of the grating coupler reflector on the photonics chip.

In an example embodiment, a method is disclosed for aligning an optical fiber. The method includes having a photonics chip that includes a grating coupler reflector and an optical grating coupler. The grating coupler reflector includes a vertical scattering region, an optical waveguide optically coupled to the vertical scattering region, and a reflector positioned at an end of the optical waveguide. The reflector is configured to reflect light that propagates through the optical waveguide from the vertical scattering region back toward the vertical scattering region, such that the reflected light is re-directed out of the photonics chip by the vertical scattering region as emitted light. The optical grating coupler has a location on the photonics chip that is known relative to a location of the grating coupler reflector on the photonics chip. The method includes scanning a position of a first end of an active optical fiber over the photonics chip as light is emitted from the first end of the active optical fiber. A second end of the active optical fiber is connected to a photodetector device to detect when light enters into the first end of the active optical fiber. The method also includes detecting light entering the first end of the active optical fiber when scanning the position of the first end of the active optical fiber over the photonics chip. The detected light corresponds to emitted light from the grating coupler reflector. The method also includes stopping the scanning of the position of the first end of the active optical fiber over the photonics chip upon detecting light entering the first end of the active optical fiber. A location of the first end of the active optical fiber on the photonics chip, upon stopping the scanning of the position of the first end of the active optical fiber over the photonics chip, indicates a determined location of the grating coupler reflector on the photonics chip. The method further includes using the determined location of the grating coupler reflector on the photonics chip to determine a location of the optical grating coupler on the photonics chip. The method then includes aligning an optical fiber to the determined location of the optical grating coupler on the photonics chip.

BRIEF DESCRIPTION OF THE DRAWINGS

FIG. 8 shows a flowchart of a method for aligning an optical fiber, in accordance with some embodiments.

DETAILED DESCRIPTION

In the following description, numerous specific details are set forth in order to provide an understanding of the present invention. It will be apparent, however, to one skilled in the art that the present invention may be practiced without some or all of these specific details. In other instances, well known process operations have not been described in detail in order not to unnecessarily obscure the present invention.

The silicon photonics industry requires coupling of optical fibers to chips so that light can be transmitted from the optical fibers into the chips and vice-versa. For ease of description, the term "chip" as used herein can refer to a semiconductor chip/die and/or an integrated circuit chip/die, and/or essentially any other electronic chip/die, and/or a photonic chip/die and/or an electro-optical chip/die, and/or any other photonic-equipped chip/die that is formed in a wafer and to which one or more optical fibers connect to provide for transmission of light from the optical fiber(s) to the chip and vice-versa. The coupling of optical fibers to a chip is referred to as fiber-to-chip coupling. Also, for ease of description, the term "wafer" as used herein refers to a substrate within which silicon photonic devices are fabricated. In various embodiments, the wafer can have different sizes and shapes. In some embodiments, the wafer has a circular horizontal cross-section shape. In some embodiments, the wafer has a rectangular horizontal cross-section shape.

It should be understood that the term "wavelength" as used herein refers to the wavelength of electromagnetic radiation. And, the term "light" as used herein refers to electromagnetic radiation within a portion of the electromagnetic spectrum that is usable by optical data communication systems. In some embodiments, this portion of the electromagnetic spectrum that is usable by optical data communication systems includes light having wavelengths within a range extending from about 1100 nanometers to about 1565 nanometers (covering from the O-Band to the C-Band, inclusively, of the electromagnetic spectrum). However, it should be understood that the portion of the electromagnetic spectrum that is usable by optical data communication systems as referred to herein can include light having wavelengths either less than 1100 nanometers or greater than 1565 nanometers, so long as the light is usable by an optical data communication system for encoding, transmission, and decoding of digital data through modulation/de-modulation of the light. In some embodiments, the light used in optical data communication systems has wavelengths in the near-infrared portion of the electromagnetic spectrum. It should be understood that a light may be confined to propagate in an optical waveguide, such as (but not limited to) an optical fiber or an optical waveguide within a planar lightwave circuit (PLC). In some embodiments, the light is polarized. And, in some embodiments, the light has a signature wavelength, where the signature wavelength can refer to either essentially one wavelength or can refer to a narrow band of wavelengths that can be identified and processed by an optical data communication system as if it were a single wavelength.

Photonic devices, such as in the data communication industry, often require optical fiber alignment to vertical optical grating couplers within chips, whether for testing of the photonic devices on the chips or for packaging of the chips. Optical grating couplers and optical fibers can have respective mode field diameters (MFDs) of similar size similar. For example, a single mode optical fiber can have a MFD within a range extending from about 8 micrometers to about 10 micrometers. In order to couple light from an optical fiber into an optical grating coupler on a chip, it is necessary to align the optical fiber within a few micrometers of a target location on the chip. Chips can have a plurality of optical grating couplers to which respective optical fibers need to be aligned. Also, the plurality of optical grating couplers on the chip can be placed over relatively large distances with respect to the precision with which the optical fibers must be aligned to the optical grating couplers.

Figure 1A:
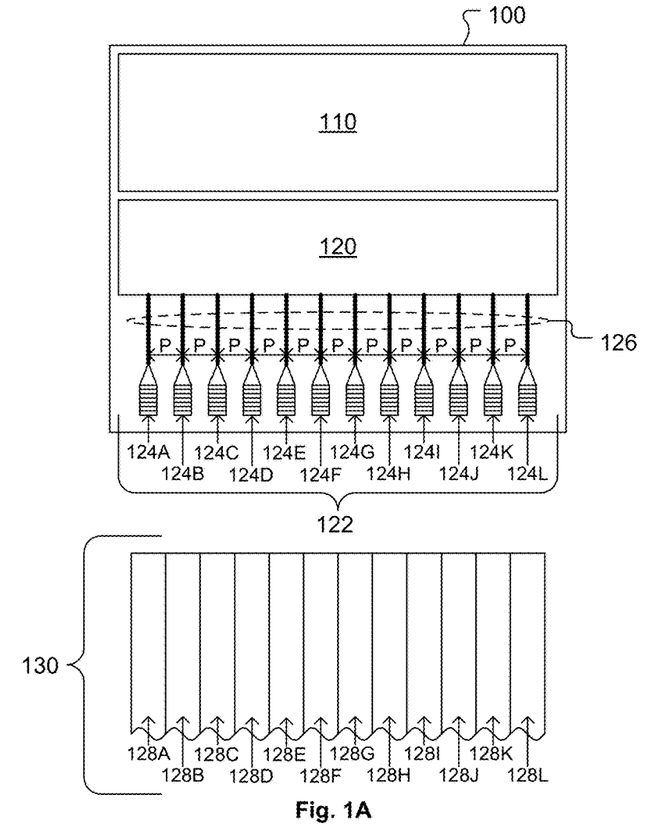
FIG. 1A shows a chip configured as a photonic integrated circuit chip, in accordance with some embodiments.

FIG. 1A shows a chip 100 configured as a photonic integrated circuit chip, in accordance with some embodiments. In various embodiments, the chip 100 can include, but is not limited to, InP, GaAs, silicon (silicon photonics, etc.), or combinations thereof. In various embodiments, the chip 100 includes an electronic circuit region 110 that includes electronic circuits, such as CMOS circuits. The chip 100 also includes a photonics circuit region 120 that includes optical devices, optical circuits, and electrical circuits. The example chip 100 includes twelve optical grating couplers 124A-124L placed co-linearly in a linear array 122 at a fixed pitch P. It should be understood that in various embodiments, the chip 100 can includes either more or less than twelve optical grating couplers. In the example chip 100, each of the optical grating couplers 124A-124L is connected to the photonics circuit region 120 by a respective optical waveguide, which are collectively circumscribed by the dashed oval 126 in FIG. 1A. In some embodiments, the pitch P is about 250 micrometers, by way of example. In these embodiments, a centerline of the first optical grating coupler 124A is about 2.75 millimeters away from a centerline of the last optical grating coupler 124L. In other embodiments, the pitch P can be either less than 250 micrometers or more than 250 micrometers. It should be understood that it can be quite difficult to precisely and quickly align twelve optical fibers 128A-128L within an optical fiber array 130 to the twelve optical grating couplers 124A-124L, particularly when the twelve optical fibers 128A-128L are independently movable with respect to each other.

Figure 1B:
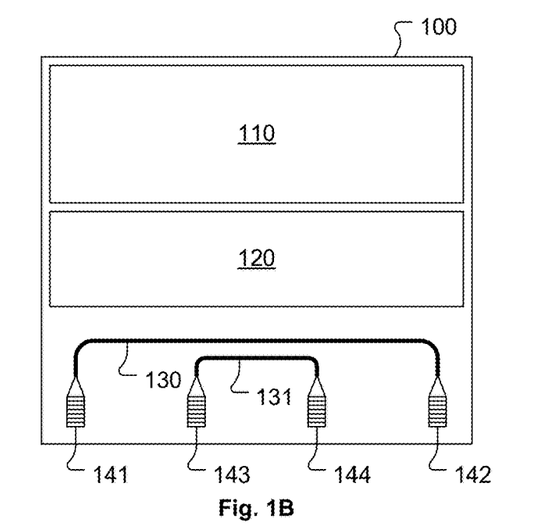
FIG. 1B shows another portion of the chip that includes a number of fiber alignment optical grating couplers and a number of associated fiber alignment optical waveguides, in accordance with some embodiments.

FIG. 1B shows another portion of the chip 100 that includes a number of fiber alignment optical grating couplers 141, 142, 143, 144, and a number of associated fiber alignment optical waveguides 130 and 131, in accordance with some embodiments. The fiber alignment optical waveguides 130 and 131 show examples of how the optical fiber alignment grating couplers 141, 142, 143, 144 can be optically connected to each other within the chip 100. For example, the fiber alignment optical waveguide 130 is configured to optically connect the fiber alignment optical grating couplers 141 and 142 to each other, such that light coupled into the fiber alignment optical grating coupler 141 will be emitted from the fiber alignment optical grating coupler 142, and vice-versa. Similarly, the fiber alignment optical waveguide 131 is configured to optically connect the fiber alignment optical grating couplers 143 and 144 to each other, such that light coupled into the fiber alignment optical grating coupler 143 will be emitted from the fiber alignment optical grating coupler 144, and vice-versa. It should be understood that in various embodiments, the chip 100 can include essentially any number of fiber alignment optical grating couplers and essentially any number and configuration of associated fiber alignment optical waveguides. In the example of FIG. 1B, the fiber alignment optical grating couplers 141, 142, 143, and 144 are positioned in a co-linear configuration. However, in other embodiments, the fiber alignment optical grating couplers 141, 142, 143, and 144 can be positioned in a configuration that is not co-linear.

In the example of FIG. 1B, the fiber alignment optical grating coupler 141 "loops-back" to the fiber alignment optical grating coupler 142 by way of the fiber alignment optical waveguide 130. In this configuration, if light within an appropriate wavelength range is launched into the fiber alignment optical grating coupler 141, the light will exit from the fiber alignment optical grating coupler 142, and vice-versa. In some embodiments, the appropriate wavelength range for the optical grating coupler 141 has a wavelength span of about 20 nanometers to about 30 nanometers. Similarly, the fiber alignment optical grating coupler 143 "loops-back" to the fiber alignment optical grating coupler 144 by way of the fiber alignment optical waveguide 131. In this configuration, if light within the appropriate wavelength range is launched into the fiber alignment optical grating coupler 143, the light will exit from the fiber alignment optical grating coupler 144, and vice-versa. It should be understood that the particular "loop-back" configurations of the fiber alignment optical grating couplers 141 and 142 and of the fiber alignment optical grating couplers 143 and 144 are provided by way of example and can vary for different embodiments.

By way of example, transmission of light into the fiber alignment optical grating coupler 141, in conjunction with detection of light emitted from the fiber alignment optical grating coupler 142 can be used to locate the fiber alignment optical grating couplers 141 and 142 on the chip 100. Then, once the fiber alignment optical grating couplers 141 and 142 are located on the chip 100, one or more optical grating couplers can be located on the chip based on a known on-chip spatial relationship between the one or more optical grating couplers and the fiber alignment optical grating couplers 141 and 142. Similarly, transmission of light into the fiber alignment optical grating coupler 143, in conjunction with detection of light emitted from the fiber alignment optical grating coupler 144 can be used to locate the fiber alignment optical grating couplers 143 and 144 on the chip 100. Then, once the fiber alignment optical grating couplers 143 and 144 are located on the chip 100, one or more optical grating couplers can be located on the chip based on a known on-chip spatial relationship between the one or more optical grating couplers and the fiber alignment optical grating couplers 143 and 144.

In some embodiments, each fiber alignment optical grating coupler 141, 142, 143, 144 has a very small MFD (e.g., about 8 micrometers to about 10 micrometers), which makes it difficult to initially align optical fibers to the fiber alignment optical grating couplers 141, 142, 143, 144, respectively. In the example of FIG. 1B, in order to detect light emitted from the fiber alignment optical grating coupler 142, the light must first be coupled into the fiber alignment optical grating coupler 141. Therefore, two optical fiber alignments are necessary. Specifically, one optical fiber alignment to the fiber alignment optical grating coupler 141 is needed, and another optical fiber alignment to the fiber alignment optical grating coupler 142 is needed. It should be understood that given the very small MFD of the optical fibers, it can be difficult to simultaneously align a first optical fiber with the fiber alignment optical grating coupler 141 and a second optical fiber with the fiber alignment optical grating coupler 142 in a precise and quick manner. The same difficultly exists with regard to alignment of optical fibers to the fiber alignment optical grating couplers 143 and 144, respectively.

Figures 2A, 2B:
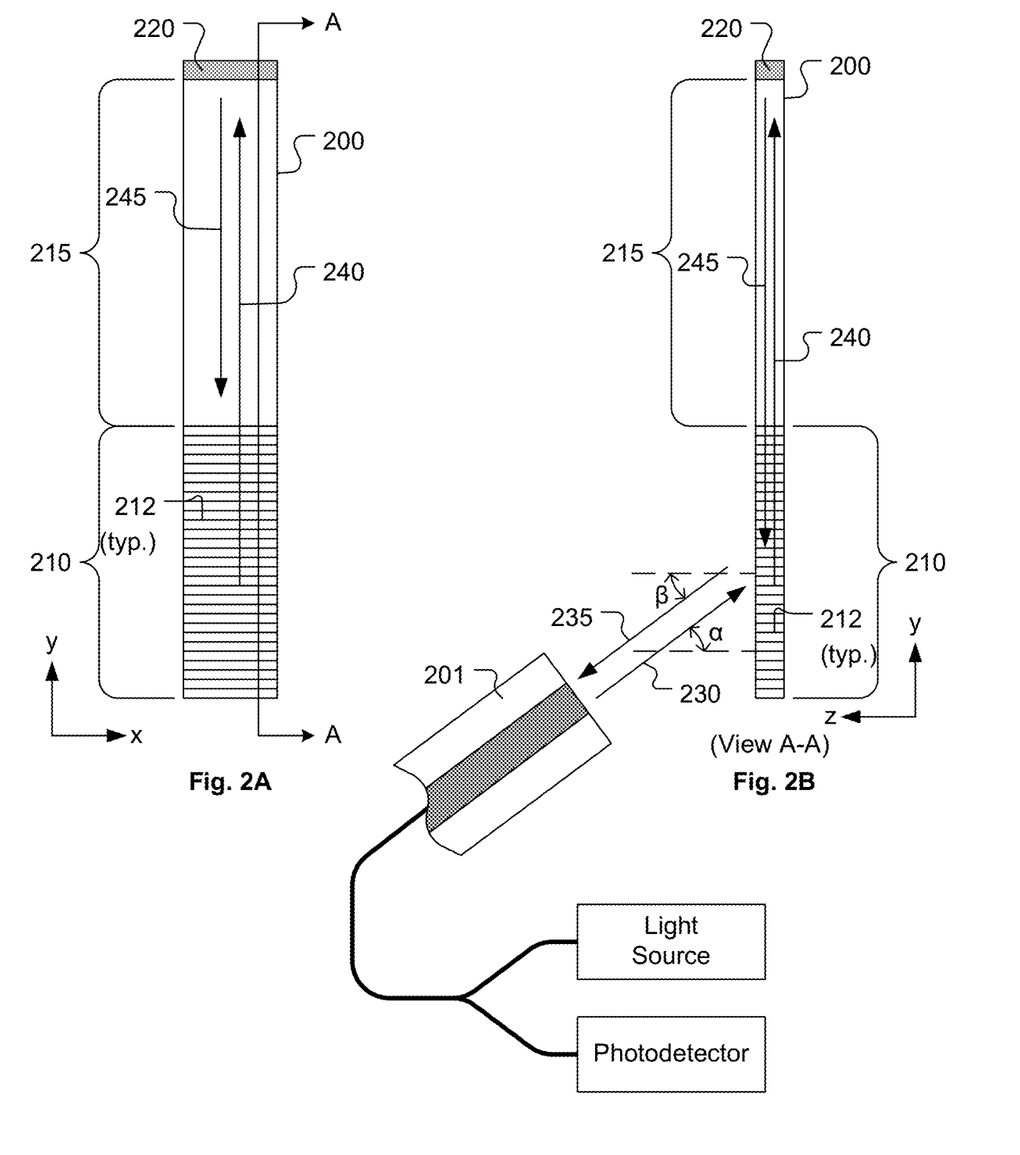
FIG. 2A shows a top view of an optical grating coupler retro reflector for use in optical fiber alignment, in accordance with some embodiments.
FIG. 2B shows a side view of the optical grating coupler retro reflector (referenced as View A-A in FIG. 2A), in accordance with some embodiments.

FIG. 2A shows a top view of an optical grating coupler retro reflector 200 for use in optical fiber alignment, in accordance with some embodiments. FIG. 2B shows a side view of the optical grating coupler retro reflector 200 (referenced as View A-A in FIG. 2A), in accordance with some embodiments. The optical grating coupler retro reflector 200 is referred to as a grating coupler (GC) reflector 200. The GC reflector 200 can be used instead of the loop-back configuration of the fiber alignment optical grating couplers 141 and 142 and the fiber alignment optical waveguide 130 in the chip 100. Also, the GC reflector 200 can be used instead of the loop-back configuration of the fiber alignment optical grating couplers 143 and 144 and the fiber alignment optical waveguide 131 in the chip 100. The GC reflector 200 includes a vertical scattering region 210, an optical waveguide 215, and a reflector 220. In some embodiments, the optical waveguide 215 and the vertical scattering region 210 are collectively formed within a region of the photonics chip having a substantially rectangular horizontal cross-section, such as shown in FIG. 2A. The side view of the GC reflector 200 in FIG. 2B shows how incident light 230 emitted from an optical device 201 is coupled into the optical waveguide 215 by the vertical scattering region 210 as coupled light 240. The coupled light 240 propagates along the optical waveguide 215 until it encounters the reflector 220, which causes the coupled light 240 to reverse its direction of propagation within the optical waveguide 215 as reflected light 245. When the reflected light 245 reaches the vertical scattering region 210, the reflected light 245 is emitted from the GC reflector 200 as emitted light 235. Therefore, the emitted light 235 is co-linear and anti-parallel to the incident light 230. The emitted light 235 will be optically coupled into the same optical device 201 used to emit the incident light 230.

In various embodiments, the optical device 201 used to emit the incident light 230 can be a single optical fiber, a fiber array, a planar lightwave circuit, another silicon photonic chip, or any photonic circuit meant to align to the chip 100. In some embodiments, the optical device 201 is connected to a photodetector device to enable detection of the emitted light 235 that enters the optical device 201. In some embodiments, the optical device 201 is referred to as an active optical fiber. In some embodiments, the GC reflector 200 will not reflect the incident light 230 at an arbitrary angle of incidence ($\alpha$) relative to the vertical scattering region 210, but will reflect the incident light 230 if the angle of incidence ($\alpha$) is at an effective angle of incidence ($\alpha$) of the GC reflector 200. In some embodiments, the GC reflector 200 has a particular range of effective angle of incidence ($\alpha$). The angle of incidence ($\alpha$) can be adjusted by setting the spacing of light scattering elements in the vertical scattering region 210. In some embodiments, the angle of incidence ($\alpha$) is within a range extending from about 6° to about 16°. If the angle of incidence ($\alpha$) is small, then the spacing of light scattering elements in the vertical scattering region 210 will be very roughly given by the wavelength of the light ($\lambda$) divided by the effective index of light ($n_{eff}$) guided in the optical waveguide 215, i.e., ($\lambda/n_{eff}$). In some embodiments, the spacing of light scattering elements in the vertical scattering region 210 is within a range extending from about 500 nanometers to about 750 nanometers. A particular design of the vertical scattering region 210 will couple light most efficiently at an optimal angle of incidence ($\alpha_{opt}$). And, in some embodiments, the vertical scattering region 210 will couple light with high efficiency at an angle of incidence ($\alpha$) that is within +/− about 1° of the optimal angle of incidence ($\alpha_{opt}$). Also, it should be understood that the GC reflector 200 will not emit the emitted light 235 at an arbitrary angle of emission ($\beta$) relative to the vertical scattering region 210, but will emit the emitted light 235 at the angle of emission ($\beta$) within a particular range, where the angle of emission ($\beta$) is substantially equal to the angle of incidence ($\alpha$).

In some embodiments, the vertical scattering region 210 of the GC reflector 200 is configured in a similar manner as a vertical scattering region of a standard optical grating coupler. For example, in some embodiments, the vertical scattering region 210 of the GC reflector 200 can be configured to include a periodic structure having a number of grating teeth 212. In some embodiments, the vertical scattering region 210 of the GC reflector 200 is configured similar to the optical grating couplers described in "Wade, Mark T. et al., '75% Efficient Wide Bandwidth Grating Couplers in a 45 nm Microelectronics CMOS Process,' 2015 IEEE Optical Interconnects Conference, IEEE, 2015," which is incorporated herein by reference in its entirety for all purposes. In various embodiments, regardless of the particular design of the vertical scattering region 210, it should be understood that the vertical scattering region 210 is configured to re-direct the incident light 230 (that is incident upon the vertical scattering region 210 from outside of the photonics chip) into the optical waveguide 215 as coupled light 240, so that the coupled light 240 travels through the optical waveguide 215 toward the reflector 220. Also, in various embodiments, regardless of the particular design of the vertical scattering region 210, it should be understood that the vertical scattering region 210 is configured to re-direct the reflected light 245, that travels through the optical waveguide 215 from the reflector 220 toward the vertical scattering region 210 and that is incident upon the vertical scattering region 210 from inside the optical waveguide 215, out of the vertical scattering region 210 as the emitted light 235.

The optical waveguide 215 is a device/component configured to guide photons (electromagnetic waves) from one location to another location. In some embodiments, the optical waveguide 215 is configured as a channel waveguide. However, it should be understood that in various embodiments the optical waveguide 215 can be configured as essentially any type of optical waveguide, so long as the optical waveguide 215 functions to guide photons from the vertical scattering region 210 toward the reflector 220, and functions to guide photons from the reflector 220 toward the vertical scattering region 210. In various embodiments, the optical waveguide 215 is formed of a material that has a higher index of refraction relative to material(s) that surround the optical waveguide 215. In various embodiments, the optical waveguide 215 is formed glass, polymer, and/or semiconductor material(s). In some embodiments, the optical waveguide 215 is formed of silicon, polysilicon, silicon nitride, silicon oxide, germanium oxide, and/or silica, among other materials.

In some embodiments, the reflector 220 of the GC reflector 200 is configured as an optical waveguide Bragg reflector in which light scattering elements are spaced according to the Bragg condition to cause reflection of the light 240 back into the optical waveguide 215 as light 245. A spacing ($\Lambda$) of light scattering elements within the Bragg reflector 220 is equal to the optical wavelength ($\lambda$) divided by twice the effective index of light propagation ($n_{eff}$), i.e., ($\Lambda=\lambda/(2n_{eff})$). In various embodiments, the effective index of light propagation ($n_{eff}$) is within in a range extending from about 2.0 to about 2.7. In some embodiments, the spacing ($\Lambda$) of light scattering elements within the Bragg reflector 220 is within a range extending from about 200 nanometers to about 400 nanometers. In some embodiments, the spacing ($\Lambda$) of light scattering elements within the Bragg reflector 220 is within a range extending from about 250 nanometers to about 350 nanometers. In some embodiments, the Bragg reflector 220 includes a series of breaks in a silicon optical guiding layer, where a spacing between adjacent breaks along the length of the optical waveguide is given by ($\Lambda$), where $\Lambda=\lambda/(2n_{eff})$, as described above. In some embodiments, the Bragg reflector 220 includes partial-etch features and/or added features, such as polysilicon features, near the main optical guiding silicon layer. In some embodiments, the Bragg reflector 220 includes both breaks in the silicon optical guiding layer and polysilicon features, each repeated with a spacing of about ($\Lambda$), where $\Lambda=\lambda/(2n_{eff})$, as described above.

In some embodiments, the GC reflector 200 is configured to function in a wavelength-dependent manner, such that the incident light 230 needs to be within a relatively narrow wavelength range to be coupled into the GC reflector 200. Therefore, in these embodiments, the light source should be configured to transmit light into the optical device 201 within the relatively narrow wavelength range appropriate for coupling of the light into the GC reflector 200. In these embodiments, if the light source is broadband, the light source should have significant spectral content within the operable wavelength range of the GC reflector 200.

Also, in some embodiments, the GC reflector 200 is non-polarized. In these embodiments, the incident light 230 can be non-polarized. However, in some embodiments, the GC reflector 200 is polarized. In these embodiments, the incident light 230 should have a polarization that is compatible with a polarization of the GC reflector 200. In some embodiments, the optical device 201 is a polarization-maintaining optical device, and the light source is configured to generate light having a polarization that is compatible with the polarization of the GC reflector 200. In some embodiments, a polarization control element is disposed between the optical device 201 and the GC reflector 200, where the polarization control element functions to output the incident light 230 with a polarization that is compatible with the polarization of the GC reflector 200.

Figure 3:
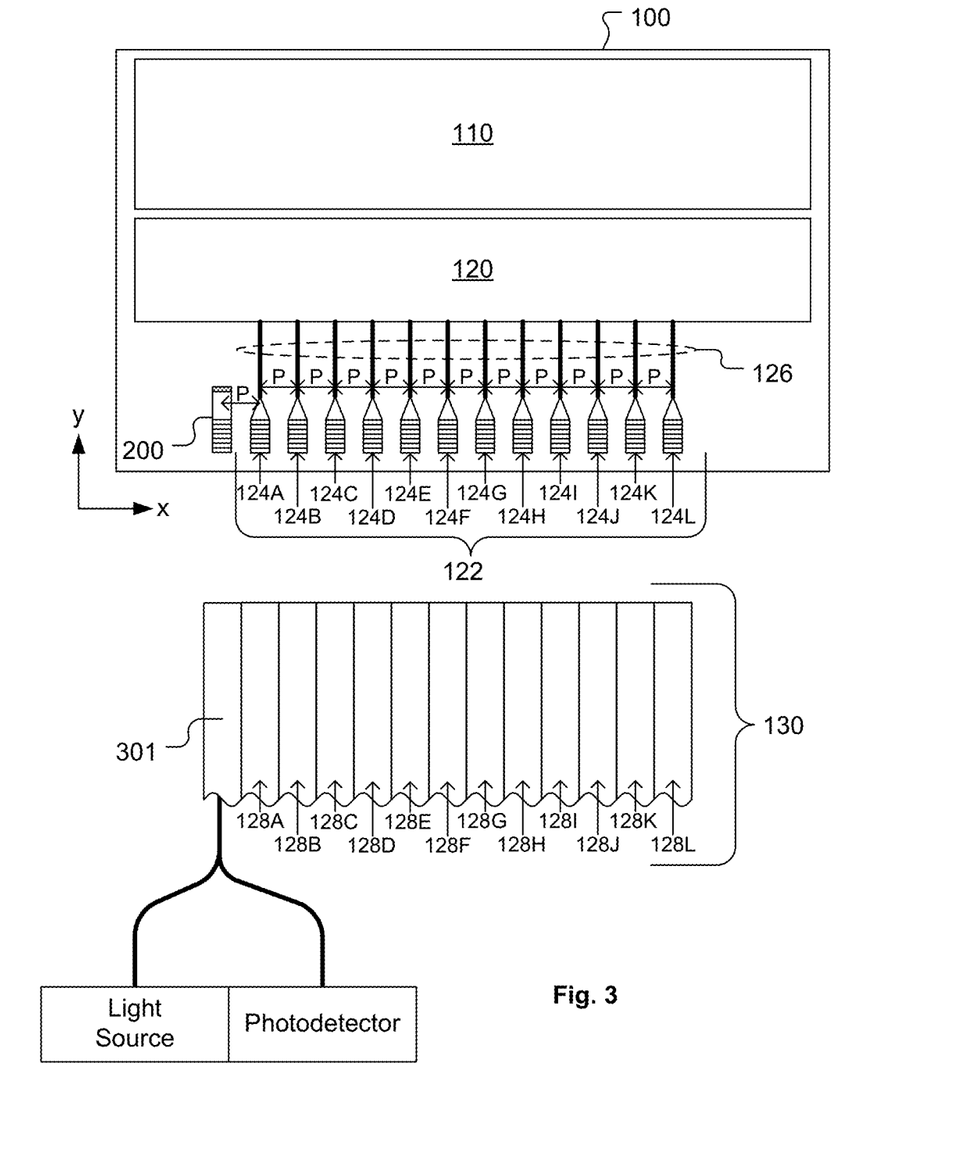
FIG. 3 shows the chip of FIG. 1A with the GC reflector formed therein, in accordance with some embodiments.

FIG. 3 shows the chip 100 of FIG. 1A with the GC reflector 200 formed therein, in accordance with some embodiments. In various embodiments, the GC reflector 200 can be arbitrarily positioned on the chip 100. However, it should be understood that the spatial relationship(s) between the GC reflector 200 on the chip 100 and the optical grating couplers 124A-124L on the chip 100 is precisely known. Therefore, when the location of the GC reflector 200 on the chip 100 is determined, the location(s) of the optical grating couplers 124A-124L on the chip 100 will be known based on reference to the determined location of the GC reflector 200 on the chip 100. In some embodiments, it is useful to have the GC reflector 200 positioned in a consistent pattern with the optical grating couplers 124A-124L, such as in a co-linear pattern and/or at the same pitch P, such as shown in FIG. 3. For example, in these embodiments, the optical fiber 301 can be attached to the end of the optical fiber array 130 so that when the GC reflector 200 on the chip 100 is determined by scanning of the optical fiber 301 over the chip 100, the other optical fibers 128A-128L will be positioned substantially over the optical grating couplers 124A-124L on the chip 100. More specifically, in order to align the optical fiber array 130 to the linear array 122 of optical grating couplers 124A-124L, a user can emit light from the optical fiber 301 and scan the optical fiber over the surface of the chip 100 until a reflection of light caused by the GC reflector 200 is detected through the optical fiber 301. In some embodiments, the user can use an optical circulator coupled to a photodetector to detect when the optical fiber 301 is optically coupled to the GC reflector 200. Since the location of the GC reflector 200 on the chip 100 is precisely known relative to other features on the chip 100, once the GC reflector 200 is located on the chip 100, the locations of the optical grating couplers 124A-124L on the chip 100 will be known. Therefore, once the GC reflector 200 is located on the chip 100 by scanning of the optical fiber 301 over the chip 100, the optical fiber array 130 can be optically coupled to the linear array 122 of optical grating couplers 124A-124L using the GC reflector 200 location as a reference point.

In some embodiments, a general location of the GC reflector 200 on the chip 100 is known. In these embodiments, the scan of the optical fiber 301 can be initiated at or near the general location of the GC reflector 200 on the chip 100. It should be understood that the scan of the optical fiber 301 over the chip 100 can be done in many different ways, so long as the optical fiber 301 is moved over the chip 100 in a systematic manner to enable location of the GC reflector 200. In some embodiments, the optical fiber 301 is moved in raster scan manner over the chip 100, such that the optical fiber 301 is moved in a horizontal manner (x-direction) over an area of the chip 100 at successive vertical positions (y-direction) within the area of the chip 100 until the GC reflector 200 is located.

Figure 4:
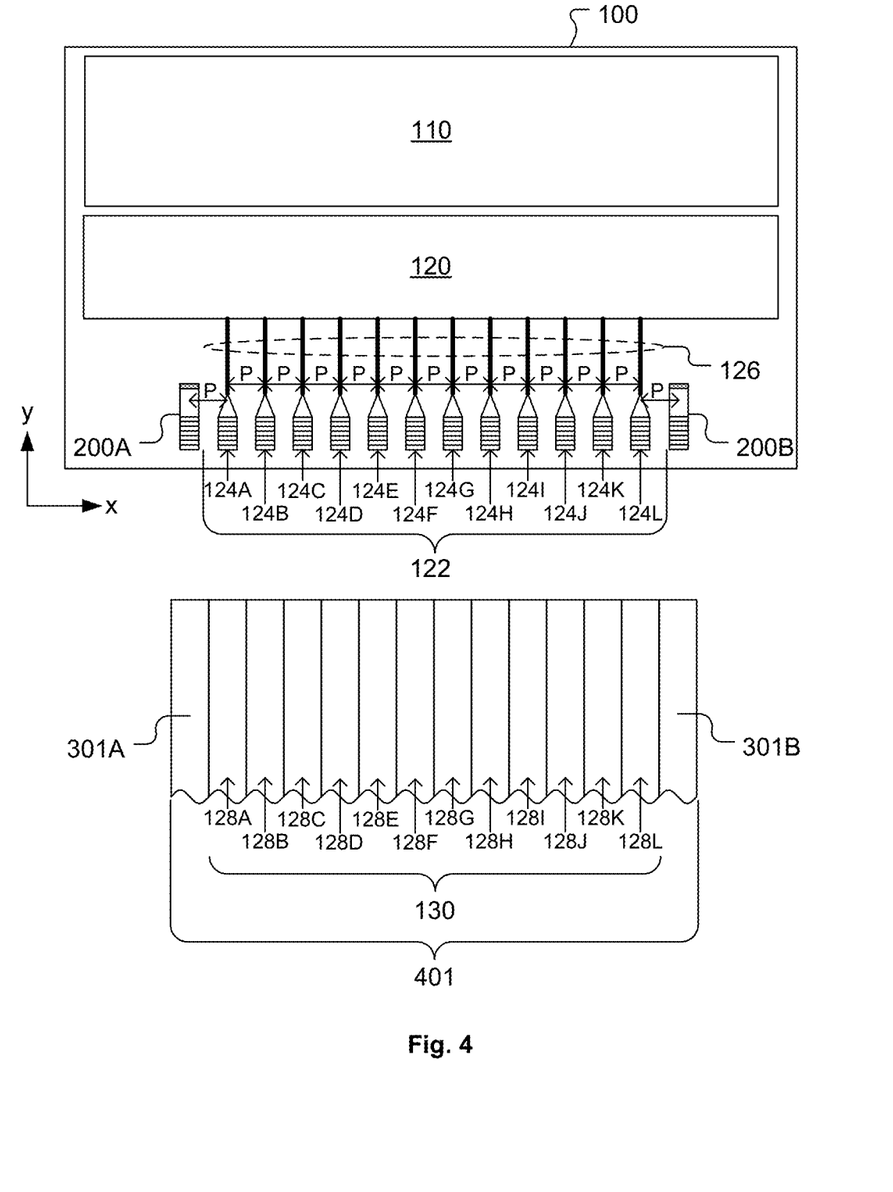
FIG. 4 shows the chip with two GC reflectors positioned at opposite ends of the linear array of optical grating couplers, in accordance with some embodiments.

It should be understood that placement of one or more GC reflector(s) 200 on the chip 100 is not constrained. In various embodiments, one or more GC reflector(s) 200 can be formed within the chip 100, with the location(s) of the GC reflector(s) 200 on the chip 100 being precisely known relative to other features on the chip 100, and in particular relative to other optical grating couplers on the chip. Also, in some embodiments, it can be useful to have multiple GC reflectors 200 positioned on the chip 100 to assist with simultaneous alignment of multiple optical fibers. For example, FIG. 4 shows the chip 100 with two GC reflectors 200A and 200B positioned at opposite ends of the linear array 122 of optical grating couplers 124A-124L, in accordance with some embodiments. With the configuration of FIG. 4, it is possible to align two optical fibers 301A and 301B to the chip 100 at the same time. It should be understood that in this example embodiment, the first and second optical fibers 301A and 301B and the optical fibers 128A-128L of the optical fiber array 130 collectively form a unitary structure 401, such that movement of the optical fiber 301A causes corresponding movement of the optical fibers 128A-128L and 301B. Also, in this embodiment, the pitch of the optical cores of the optical fibers 301A, 128A-128L, 301B within the unitary structure 401 substantially matches the pitch P of the optical grating couplers 124A-124L within the linear array 122.

In an example embodiment, a user can emit light from the first optical fiber 301A and scan the first optical fiber 301A (along with the unitary structure 401) over the surface of the chip 100 until a reflection of light is seen from the first GC reflector 200A within the first optical fiber 301A, at which point the first optical fiber 301A is optically coupled to the first GC reflector 200A. Once the first optical fiber 301A is optically coupled to the first GC reflector 200A, the unitary structure 401 can be rotated about the location of the first GC reflector 200A while emitting light from the second optical fiber 301B. Then, when a reflection of light is seen from the second GC reflector 200B within the second optical fiber 301B, the second optical fiber 301B is optically coupled to the second GC reflector 200B, and the optical fibers 128A-128L of the optical fiber array 130 should be respectively optically coupled to the optical grating couplers 124A-124L of the linear array 122.

In another example embodiment, the first optical fiber 301A and the second optical fiber 301B are physically separate from the optical fiber array 130. In this embodiment, a user can emit light from the first optical fiber 301A and scan the first optical fiber 301A over the surface of the chip 100 until a reflection of light is seen from the first GC reflector 200A within the first optical fiber 301A, at which point the first optical fiber 301A is optically coupled to the first GC reflector 200A and the location of the first GC reflector 200A on the chip 100 is precisely known. Also, the user can emit light from second first optical fiber 301B and scan the second optical fiber 301B over the surface of the chip 100 until a reflection of light is seen from the second GC reflector 200B within the second optical fiber 301B, at which point the second optical fiber 301B is optically coupled to the second GC reflector 200B and the location of the second GC reflector 200B on the chip 100 is precisely known. In various embodiments, the scanning of the first optical fiber 301A and the second optical fiber 301B over the chip 100 can be done either concurrently or sequentially. Once the locations on the chip 100 of the first GC reflector 200A and the second GC reflector 200B are precisely known, the optical fiber array 130 can be precisely positioned on the chip 100 based on the locations of the first GC reflector 200A and the second GC reflector 200B, such that the optical fibers 128A-128L are optically coupled to the optical grating couplers 124A-124L, respectively. Therefore, it should be understood that both a location and an orientation of the linear array 122 of optical grating couplers 128A-128L on the chip 100 is determinable using both the location of the first GC reflector 200A on the chip 100 and the location of the second GC reflector 200B on the chip 100.

Figure 5:
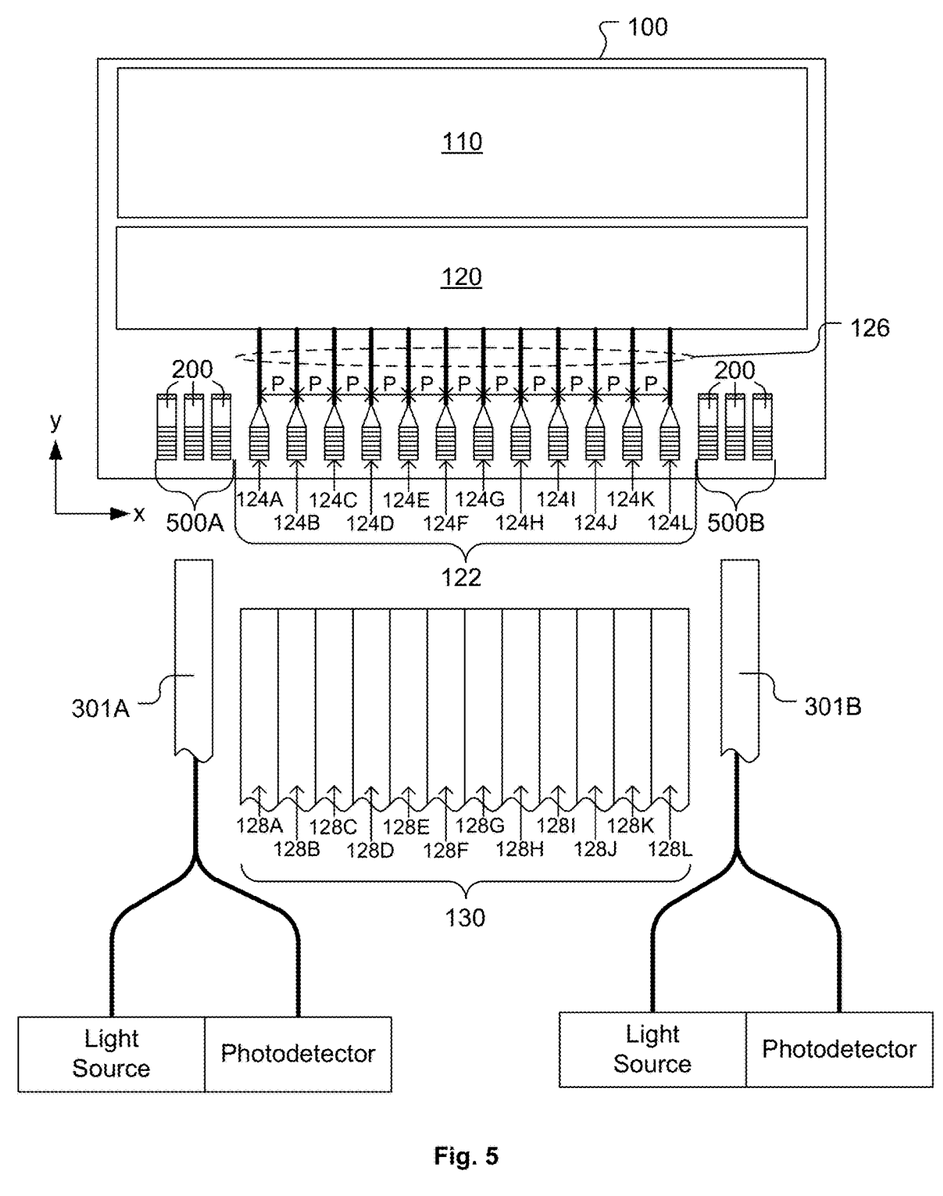
FIG. 5 shows the chip of FIG. 1A formed to include a first GC reflector array and a second GC reflector array, in accordance with some embodiments.

In some embodiments, multiple GC reflectors 200 can be arranged together on the chip 100 to make it easier to locate the GC reflector 200. For example, FIG. 5 shows the chip 100 of FIG. 1A formed to include a first GC reflector array 500A and a second GC reflector array 500B, in accordance with some embodiments. Each of the first GC reflector array 500A and a second GC reflector array 500B includes multiple GC reflectors 200. In some embodiments, the multiple GC reflectors 200 in the first GC reflector array 500A are arranged in a co-linear manner. Similarly, in some embodiments, the multiple GC reflectors 200 in the second GC reflector array 500B are arranged in a co-linear manner. However, it should be understood that in some embodiments, the multiple GC reflectors 200 in the first GC reflector array 500A are arranged close together but not necessarily in the co-linear manner. Also, in some embodiments, the multiple GC reflectors 200 in the second GC reflector array 500B are arranged close together but not necessarily in the co-linear manner. While the first GC reflector array 500A includes three GC reflectors 200, it should be understood that in various embodiments the first GC reflector array 500A can include any number of GC reflectors 200 that is two or more. Similarly, while the second GC reflector array 500B includes three GC reflectors 200, it should be understood that in various embodiments the second GC reflector array 500B can include any number of GC reflectors 200 that is two or more.

Since each of the first GC reflector array 500A and the second GC reflector array 500B is larger than a single GC reflector 200 alone, each of the first GC reflector array 500A and the second GC reflector array 500B effectively makes the light reflection search targets on the chip 100 larger and easier to find when scanning the light emitting optical fibers 301A and 301B over the chip 100, which in turn makes it easier to align the optical fibers 128A-128L of the optical fiber array 130 to the optical grating couplers 124A-124L of the linear array 122. In some embodiments, a user can emit light from the first optical fiber 301A and scan the first optical fiber 301A over the surface of the chip 100 until a reflection of light is seen from the first GC reflector array 500A within the first optical fiber 301A, at which point the location of the first GC reflector array 500A on the chip 100 is precisely known. Also, the user can emit light from second first optical fiber 301B and scan the second optical fiber 301B over the surface of the chip 100 until a reflection of light is seen from the second GC reflector array 500B within the second optical fiber 301B, at which point the location of the second GC reflector array 500B on the chip 100 is precisely known. In various embodiments, the scanning of the first optical fiber 301A and the second optical fiber 301B over the chip 100 can be done either concurrently or sequentially. Once the locations on the chip 100 of the first GC reflector array 500A and the second GC reflector array 500B are precisely known, the optical fiber array 130 can be precisely positioned on the chip 100 based on the locations of the first GC reflector array 500A and the second GC reflector array 500B, such that the optical fibers 128A-128L are optically coupled to the optical grating couplers 124A-124L, respectively.

Figures 6A, 6B:
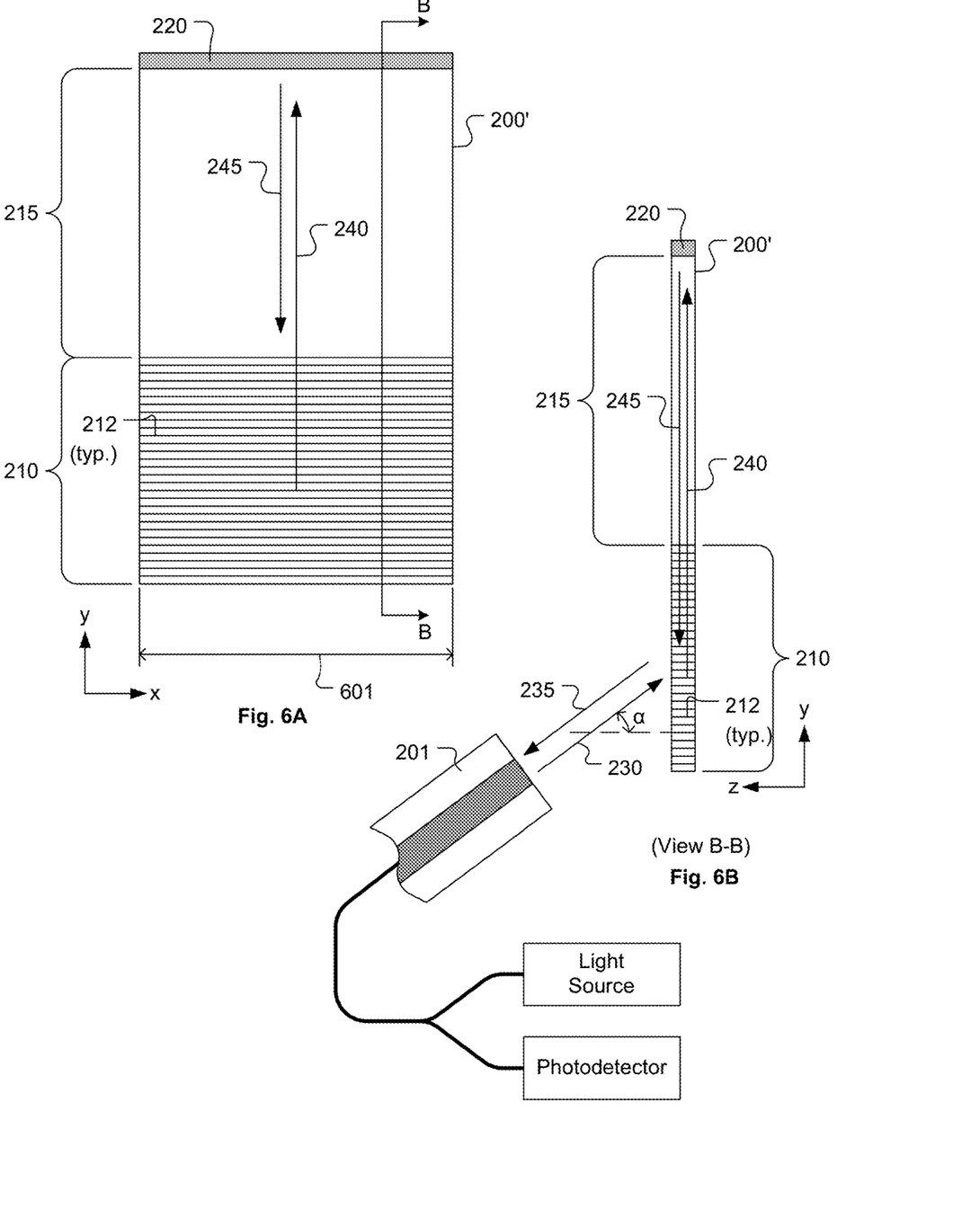
FIG. 6A shows a top view of a wide GC reflector, in accordance with some embodiments.
FIG. 6B shows a side view of the GC reflector (referenced as View B-B in FIG. 6A), in accordance with some embodiments.

In some embodiments, the GC reflector 200 can be formed to have a larger size than the optical grating couplers on the chip 100 to make it easier to locate the GC reflectors 200. For example, FIG. 6A shows a top view of a wide GC reflector 200', in accordance with some embodiments. FIG. 6B shows a side view of the GC reflector 200' (referenced as View B-B in FIG. 6A), in accordance with some embodiments. The wide GC reflector 200' is a modified version of the GC reflector 200, in that the wide GC reflector 200' has a width 601 that is larger than the GC reflector 200. In some embodiments, the width 601 of the GC reflector 200 is greater than about 16 micrometers. It should be appreciated that standard vertical grating couplers typically have widths substantially less than 16 micrometers in order to achieve high coupling efficiency with input light beams (e.g., with input light beams from an optical fiber). By increasing the size of the GC reflector 200', it is easier to align a light emitting/detecting optical fiber (active optical fiber) to the GC reflector 200' when scanning the light emitting/detecting optical fiber over the chip 100. In some embodiments, the reflector 220 can be curved to focus the reflected light 245 through the optical waveguide 215 back toward the vertical scattering region 210. In some embodiments, applying a curvature to the reflector 220 is more easily implemented with the GC reflector 200' that has the larger width 601. In some embodiments, the reflector 220 can be its own GC reflector 200/200'. More specifically, in some embodiments, the vertical scattering region 210 and the reflector 220 are spatially superimposed on each other, rather than being spatially separated from each other by the optical waveguide 215.

Figure 7:
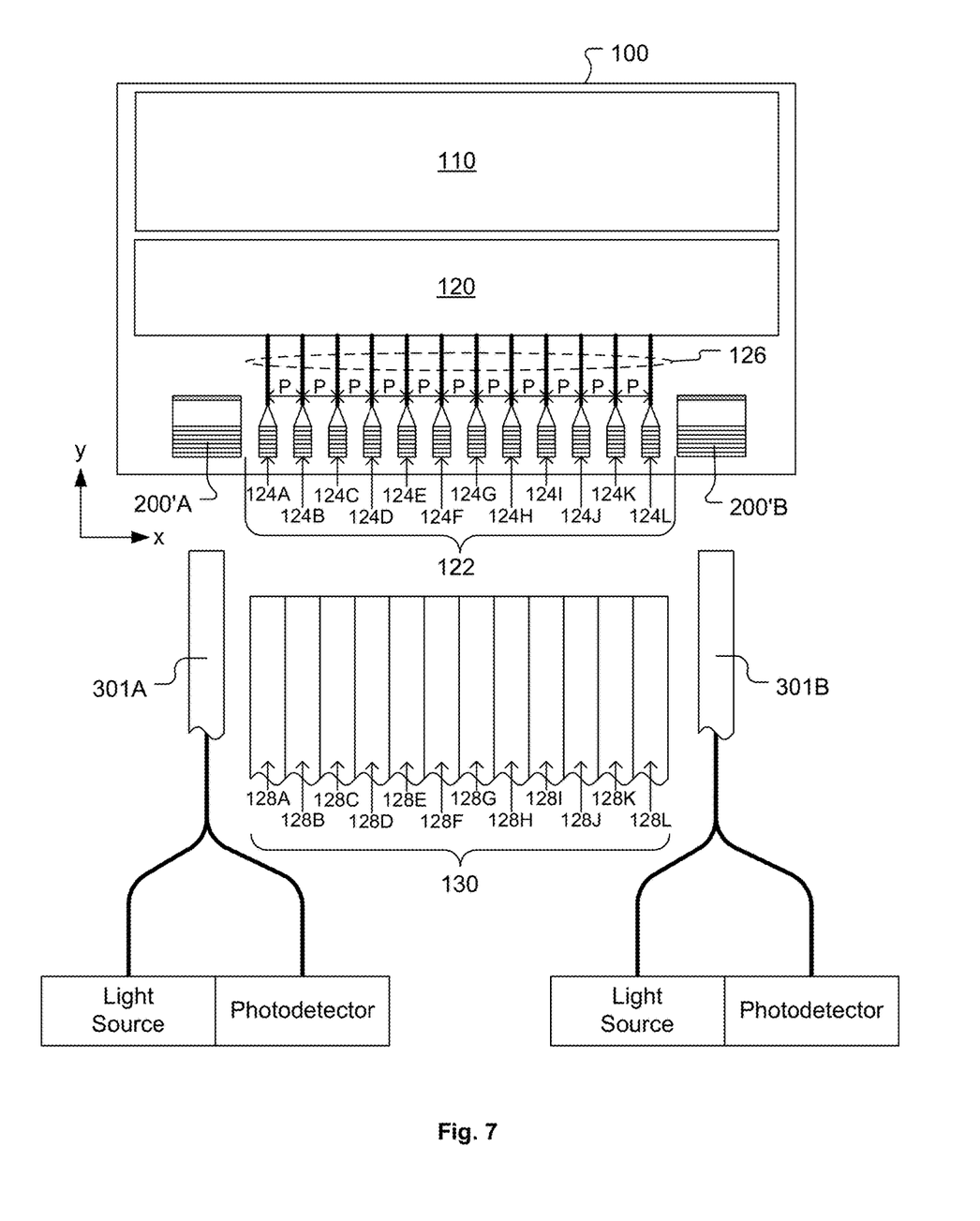
FIG. 7 shows the chip of FIG. 1A formed to include a first wide GC reflector and a second wide GC reflector, in accordance with some embodiments.

FIG. 7 shows the chip 100 of FIG. 1A formed to include a first wide GC reflector 200'A and a second wide GC reflector 200'B, in accordance with some embodiments. Since each of the first wide GC reflector 200'A and the second wide GC reflector 200'B is larger than the "regular" GC reflector 200, each of the first wide GC reflector 200'A and the second GC reflector 200'B effectively makes the light reflection search targets on the chip 100 larger and easier to find when scanning the light emitting optical fibers 301A and 301B over the chip 100, which in turn makes it easier to align the optical fibers 128A-128L of the optical fiber array 130 to the optical grating couplers 124A-124L of the linear array 122. In some embodiments, a user can emit light from the first optical fiber 301A and scan the first optical fiber 301A over the surface of the chip 100 until a reflection of light is seen from the first wide GC reflector 200'A within the first optical fiber 301A, at which point the location of the first wide GC reflector 200'A on the chip 100 is precisely known. Also, the user can emit light from the second optical fiber 301B and scan the second optical fiber 301B over the surface of the chip 100 until a reflection of light is seen from the second wide GC reflector 200'B within the second optical fiber 301B, at which point the location of the second wide GC reflector 200'B on the chip 100 is precisely known. In various embodiments, the scanning of the first optical fiber 301A and the second optical fiber 301B over the chip 100 can be done either concurrently or sequentially. Once the locations on the chip 100 of the first wide GC reflector 200'A and the second wide GC reflector 200'B are precisely known, the optical fiber array 130 can be precisely positioned on the chip 100 based on the locations of the first wide GC reflector 200'A and the second wide GC reflector 200'B, such that the optical fibers 128A-128L are optically coupled to the optical grating couplers 124A-124L, respectively.

FIG. 8 shows a flowchart of a method for aligning an optical fiber, in accordance with some embodiments. The method includes an operation 801 for having a photonics chip (100) that includes a grating coupler reflector (200) and an optical grating coupler (124A-124L). The grating coupler reflector (200) includes a vertical scattering region (210), an optical waveguide (215) optically coupled to the vertical scattering region (210), and a reflector (220) positioned at an end of the optical waveguide (215). The reflector (220) is configured to reflect light (240) that propagates through the optical waveguide (215) from the vertical scattering region (210) back toward the vertical scattering region (210), such that the reflected light (245) is re-directed out of the photonics chip (100) by the vertical scattering region (210) as emitted light (235). The optical grating coupler (124A-124L) has a location on the photonics chip (100) that is known relative to a location of the grating coupler reflector (200) on the photonics chip (100).

The method also includes an operation 803 for scanning a position of a first end of an active optical fiber (201, 301, 301A, 301B) over the photonics chip (100) as light is emitted from the first end of the active optical fiber (201, 301, 301A, 301B). The active optical fiber (201, 301, 301A, 301B) has a second end that is connected to a photodetector device to detect when light enters into the first end of the active optical fiber (201, 301, 301A, 301B). In some embodiments, scanning the position of the first end of the active optical fiber (201, 301, 301A, 301B) over the photonics chip (100) includes moving the first end of the active optical fiber (201, 301, 301A, 301B) over the chip (100) in a raster scan manner. In some embodiments, scanning the position of the first end of the active optical fiber (201, 301, 301A, 301B) over the photonics chip (100) includes orienting the first end of the active optical fiber (201, 301, 301A, 301B) at an effective angle of incidence (α) of the grating coupler reflector (200). The method also includes an operation 805 for detecting light entering the first end of the active optical fiber (201, 301, 301A, 301B) when scanning the position of the first end of the active optical fiber (201, 301, 301A, 301B) over the photonics chip (100). The detected light corresponds to emitted light (235) from the grating coupler reflector (200).

The method also includes an operation 807 for stopping the scanning of the position of the first end of the active optical fiber (201, 301, 301A, 301B) over the photonics chip (100) upon detecting light entering the first end of the active optical fiber (201, 301, 301A, 301B). A location of the first end of the active optical fiber (201, 301, 301A, 301B) on the photonics chip (100), upon stopping the scanning of the position of the first end of the active optical fiber (201, 301, 301A, 301B) over the photonics chip (100), indicates a determined location of the grating coupler reflector (200) on the photonics chip (100). The method also includes an operation 809 for using the determined location of the grating coupler reflector (200) on the photonics chip (100) to determine a location of the optical grating coupler (124A-124L) on the photonics chip (100). The method also includes an operation 811 for aligning an optical fiber (128A-128L) to the determined location of the optical grating coupler (124A-124L) on the photonics chip (100).

In some embodiments, the grating coupler reflector (200) is a first grating coupler reflector (200A, 200'A, 500A), and the photonics chip (100) includes a second grating coupler reflector (200B, 200'B, 500B). Also, the optical grating coupler (124A-124L) is one of multiple optical grating couplers (124A-124L) within an array (122) of optical grating couplers (124A-124L) on the photonics chip (100). In these embodiments, the method includes repeating the scanning of the position of the first end of the active optical fiber (201, 301, 301A, 301B) over the photonics chip (100) as light is emitted from the first end of the active optical fiber (201, 301, 301A, 301B), until light is detected entering the first end of the active optical fiber (201, 301, 301A, 301B) from the second grating coupler reflector (200B, 200'B, 500B), thereby determining a location of the second grating coupler reflector (200B, 200'B, 500B) on the photonics chip (100). Then, the method includes using both the determined location of the first grating coupler reflector (200A, 200'A, 500A) on the photonics chip (100) and the determined location of the second grating coupler reflector (200B, 200'B, 500B) on the photonics chip (100) to determine a location and an orientation of the array (122) of optical grating couplers (124A-124L) on the photonics chip (100). The method further includes using the determined location and orientation of the array (122) of optical grating couplers (124A-124L) on the photonics chip (100) to align multiple optical fibers (128A-128L) to the multiple optical grating couplers (124A-124L) within the array (122) of optical grating couplers (124A-124L) on the photonics chip (100).

Figure 9:
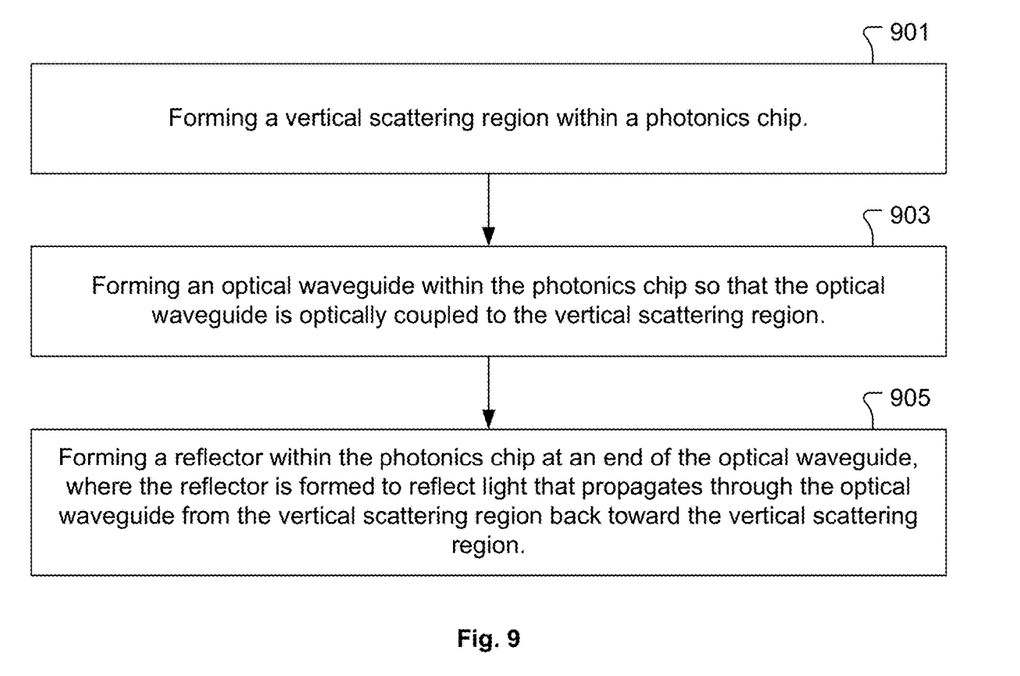
FIG. 9 shows a flowchart of a method for manufacturing a grating coupler reflector, in accordance with some embodiments.

FIG. 9 shows a flowchart of a method for manufacturing a grating coupler reflector (200), in accordance with some embodiments. The method includes an operation 901 for forming a vertical scattering region (210) within a photonics chip (100). The method also includes an operation 903 for forming an optical waveguide (215) within the photonics chip (100) so that the optical waveguide (215) is optically coupled to the vertical scattering region (210). The method also includes an operation 905 for forming a reflector (220) within the photonics chip (100) at an end of the optical waveguide (215). The reflector (220) is formed to reflect light that propagates through the optical waveguide (215) from the vertical scattering region (210) back toward the vertical scattering region (210).

The vertical scattering region (210) is formed to re-direct incident light (230) that is incident upon the vertical scattering region (210) from outside of the photonics chip (100) into the optical waveguide (215). Also, the vertical scattering region (210) is formed to re-direct reflected (245) light that is incident upon the vertical scattering region (210) from inside the optical waveguide (215) out of the photonics chip (100) as emitted light (235). In some embodiments, the vertical scattering region (210) is formed to re-direct incident light (230) into the optical waveguide (215) only when an angle of incidence (α) of the incident light (230) relative to the vertical scattering region (210) is within a particular range. Also, in some embodiments, the vertical scattering region (210) is formed to emit the emitted light (235) from the vertical scattering region (210) at an angle of emission (β) relative to the vertical scattering region (210) that is substantially equal to the angle of incidence (α) of the incident light (230) relative to the vertical scattering region (210).

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

Although the foregoing invention has been described in some detail for purposes of clarity of understanding, it will be apparent that certain changes and modifications can be practiced within the scope of the appended claims. Accordingly, the present embodiments are to be considered as illustrative and not restrictive, and the invention is not to be limited to the details given herein, but may be modified within the scope and equivalents of the described embodiments.

What is claimed is:

1. A grating coupler reflector array, comprising:
a plurality of grating coupler reflectors positioned next to each other in a side-by-side and spaced apart configuration within a photonics chip, each of the plurality of grating coupler reflectors including:
a vertical scattering region;
an optical waveguide optically coupled to the vertical scattering region, and
a reflector positioned at an end of the optical waveguide, the reflector configured to reflect light that propagates through the optical waveguide from the vertical scattering region back toward the vertical scattering region,
wherein the vertical scattering region is configured to re-direct incident light that is incident upon the vertical scattering region from outside of the photonics chip into the optical waveguide,
wherein the vertical scattering region is configured to re-direct reflected light that is incident upon the vertical scattering region from inside the optical waveguide out of the photonics chip as emitted light, and wherein the vertical scattering region is configured to re-direct incident light into the optical waveguide only when an angle of incidence of the incident light relative to the vertical scattering region is within a particular range.

2. The grating coupler reflector array as recited in claim 1, wherein the plurality of grating coupler reflectors includes at least three grating coupler reflectors.

3. The grating coupler reflector array as recited in claim 1, wherein the vertical scattering region is configured to re-direct only incident light having a specified wavelength into the optical waveguide.

4. The grating coupler reflector array as recited in claim 1, wherein the vertical scattering region is configured to emit the emitted light from the vertical scattering region at an angle of emission relative to the vertical scattering region that is substantially equal to the angle of incidence of the incident light relative to the vertical scattering region.

5. The grating coupler reflector array as recited in claim 1, wherein the optical waveguide is configured as a channel waveguide.

6. The grating coupler reflector array as recited in claim 1, wherein the optical waveguide and the vertical scattering region are collectively formed within a region of the photonics chip having a substantially rectangular horizontal cross-section.

7. The grating coupler reflector array as recited in claim 1, wherein the reflector is configured as a Bragg reflector in which light scattering elements are spaced according to a Bragg condition.

8. The grating coupler reflector array as recited in claim 7, wherein a spacing of light scattering elements within the reflector is equal to a wavelength of light incident upon the reflector divided by twice an effective index of light propagation within the reflector.

9. The grating coupler reflector array as recited in claim 8, wherein the effective index of light propagation within the reflector is within a range extending from about 2.0 to about 2.7.

10. The grating coupler reflector array as recited in claim 7, wherein a spacing of light scattering elements within the reflector is within a range extending from about 200 nanometers to about 400 nanometers.

11. The grating coupler reflector array as recited in claim 7, wherein a spacing of light scattering elements within the reflector is within a range extending from about 250 nanometers to about 350 nanometers.

12. The grating coupler reflector array as recited in claim 1, wherein the reflector is curved to focus reflected light through the optical waveguide back toward the vertical scattering region.

13. A method for manufacturing a grating coupler reflector array, comprising:
forming a plurality of grating coupler reflectors next to each other in a side-by-side and spaced apart configuration within a photonics chip, wherein forming each of the plurality of grating coupler reflectors includes:
forming a vertical scattering region within the photonics chip,
forming an optical waveguide within the photonics chip so that the optical waveguide is optically coupled to the vertical scattering region, and
forming a reflector within the photonics chip at an end of the optical waveguide, the reflector formed to reflect light that propagates through the optical waveguide from the vertical scattering region back toward the vertical scattering region, wherein the vertical scattering region is formed to re-direct incident light that is incident upon the vertical scattering region from outside of the photonics chip into the optical waveguide,
wherein the vertical scattering region is formed to re-direct reflected light that is incident upon the vertical scattering region from inside the optical waveguide out of the photonics chip as emitted light, and
wherein the vertical scattering region is formed to re-direct incident light into the optical waveguide only when an angle of incidence of the incident light relative to the vertical scattering region is within a particular range.

14. The method as recited in claim 13, wherein the plurality of grating coupler reflectors includes at least three grating coupler reflectors.

15. The method as recited in claim 13, wherein the vertical scattering region is formed to re-direct only incident light having a specified wavelength into the optical waveguide.

16. The method as recited in claim 13, wherein the vertical scattering region is formed to emit the emitted light from the vertical scattering region at an angle of emission relative to the vertical scattering region that is substantially equal to the angle of incidence of the incident light relative to the vertical scattering region.

17. The method as recited in claim 13, wherein the optical waveguide is formed as a channel waveguide.

18. The method as recited in claim 13, wherein the optical waveguide and the vertical scattering region are collectively formed within a region of the photonics chip having a substantially rectangular horizontal cross-section.

19. The method as recited in claim 13, wherein the reflector is formed as a Bragg reflector in which light scattering elements are spaced according to a Bragg condition.

20. The method as recited in claim 19, wherein a spacing of light scattering elements within the reflector is equal to a wavelength of light incident upon the reflector divided by twice an effective index of light propagation within the reflector.

21. The method as recited in claim 20, wherein the effective index of light propagation within the reflector is within a range extending from about 2.0 to about 2.7.

22. The method as recited in claim 19, wherein a spacing of light scattering elements within the reflector is within a range extending from about 200 nanometers to about 400 nanometers.

23. The method as recited in claim 19, wherein a spacing of light scattering elements within the reflector is within a range extending from about 250 nanometers to about 350 nanometers.

24. The method as recited in claim 13, wherein the reflector is formed to have a curve to focus reflected light through the optical waveguide back toward the vertical scattering region.

25. A photonics chip, comprising:
a plurality of grating coupler reflectors positioned next to each other in a side-by-side and spaced apart configuration, each of the plurality of grating coupler reflectors including a vertical scattering region, an optical waveguide optically coupled to the vertical scattering region, and a reflector positioned at an end of the optical waveguide, the reflector configured to reflect light that propagates through the optical waveguide from the vertical scattering region back toward the vertical scattering region, wherein the vertical scattering region is configured to re-direct incident light that is incident upon the vertical scattering region from outside of the photonics chip into the optical waveguide, wherein the vertical scattering region is configured to re-direct reflected light that is incident upon the vertical scattering region from inside the optical waveguide out of the photonics chip as emitted light, and wherein the vertical scattering region is configured to re-direct incident light into the optical waveguide only when an angle of incidence of the incident light relative to the vertical scattering region is within a particular range; and at least one optical grating coupler having a location on the photonics chip that is known relative to a location of the plurality of grating coupler reflectors on the photonics chip.

26. The photonics chip as recited in claim 25, wherein the plurality of grating coupler reflectors includes at least three grating coupler reflectors.

27. The photonics chip as recited in claim 25, wherein the vertical scattering region is configured to re-direct only incident light having a specified wavelength into the optical waveguide.

28. The photonics chip as recited in claim 25, wherein the vertical scattering region is configured to emit the emitted light from the vertical scattering region at an angle of emission relative to the vertical scattering region that is substantially equal to the angle of incidence of the incident light relative to the vertical scattering region.

29. The photonics chip as recited in claim 25, wherein the reflector is configured as a Bragg reflector in which light scattering elements are spaced according to a Bragg condition.

30. The photonics chip as recited in claim 29, wherein a spacing of light scattering elements within the reflector is within a range extending from about 200 nanometers to about 400 nanometers.

31. The photonics chip as recited in claim 29, wherein a spacing of light scattering elements within the reflector is within a range extending from about 250 nanometers to about 350 nanometers.

32. The photonics chip as recited in claim 25, wherein the reflector is curved to focus reflected light through the optical waveguide back toward the vertical scattering region.

33. The photonics chip as recited in claim 25, further comprising:

an array of optical grating couplers having a location on the photonics chip that is known relative to the location of the plurality of grating coupler reflectors on the photonics chip.

34. The photonics chip as recited in claim 25, wherein the plurality of grating coupler reflectors is a first plurality of grating coupler reflectors, the photonics chip including a second plurality of grating coupler reflectors positioned next to each other in a side-by-side and spaced apart configuration, each of the second plurality of grating coupler reflectors having a same configuration as each of the first plurality of grating coupler reflectors, wherein the location of the at least one optical grating coupler on the photonics chip is known relative to both the location of the first plurality of grating coupler reflectors on the photonics chip and the location of the second plurality of grating coupler reflectors on the photonics chip.

35. The photonics chip as recited in claim 34, wherein the at least one optical grating coupler is included within an array of optical grating couplers, and wherein both a location and an orientation of the array of optical grating couplers on the photonics chip is determinable using both the location of the first plurality of grating coupler reflectors on the photonics chip and the location of the second plurality of grating coupler reflectors on the photonics chip.

* * * * *